United States Patent [19]

Riskin

[11] Patent Number: 4,649,563
[45] Date of Patent: Mar. 10, 1987

[54] METHOD OF AND MEANS FOR ACCESSING COMPUTERIZED DATA BASES UTILIZING A TOUCH-TONE TELEPHONE INSTRUMENT

[75] Inventor: Bernard N. Riskin, Lambertville, N.J.

[73] Assignee: R L Associates, Yardley, Pa.

[21] Appl. No.: 595,788

[22] Filed: Apr. 2, 1984

[51] Int. Cl.⁴ .......................................... H04M 11/00
[52] U.S. Cl. ........................................ 379/97; 379/88
[58] Field of Search .................. 179/2 A, 2 DP, 6.08, 179/6.11; 340/825.48, 825.74

[56] References Cited

U.S. PATENT DOCUMENTS

| | | | |
|---|---|---|---|
| 3,500,327 | 3/1970 | Belcher et al. | 179/2 DP |
| 3,614,328 | 10/1971 | McNaughton et al. | 179/2 DP |
| 4,088,838 | 5/1978 | Nakata et al. | 179/2 A |
| 4,122,307 | 10/1978 | Suehiro | 179/6.11 X |
| 4,164,025 | 8/1979 | Dubnowski et al. | |
| 4,165,446 | 8/1979 | Flowers et al. | 179/2 DP |
| 4,191,855 | 3/1980 | Sakai | 179/2 DP X |
| 4,327,251 | 4/1982 | Fomenko et al. | 179/6.08 X |
| 4,341,929 | 7/1982 | Alexander et al. | |
| 4,427,848 | 1/1984 | Tsakanikas et al. | 179/2 DP |
| 4,608,460 | 8/1986 | Carter et al. | |

OTHER PUBLICATIONS

Dennis Ritchie, "Viewpoint: Research Has Always Had to Pay Its Way," Bell Lab News, Sep. 10, 1984, p. 2.
Graham Langley, "Telephony's Dictionary", p. 89; Telephony Publishing Corp., Chicago, Ill., Jun. 1982.
Smith et al, "Alphabetic Data Entry Via the Touch-- Tone Pad: A Comment," Human Factors, 13(2), Apr. 1971, pp. 189-190.
Rabiner et al, "Digital Techniques for Computer Voice Response: Implementation and Applications," Proceedings of the IEEE, vol. 64, No. 4, Apr. 1976, pp. 416-433 (see pp. 428, 432).

Primary Examiner—Keith E. George
Attorney, Agent, or Firm—Sperry, Zoda & Kane

[57] ABSTRACT

A conventional Touch-Tone telephone instrument is rendered functional in the same manner and to the same extent as a computer terminal having alpha-numeric capability, as regards transmission of queries directed to computerized data bases. It is also rendered functional as a recipient of information transmitted from the data base through a telephone network to provide intelligence heretofore made available only on the video screen of the computer terminal, or through automatic printers. Disclosed is the substitution of the instrument for a computer terminal and its associated video screen or teleprinter, without requirement of modification of the instrument, so that a subscriber gains from the use of the telephone functions heretofore obtainable only by providing oneself with a computer terminal and its associated screen and/or automatic printer. The user spells out one or more words by depressing the conventional, alpha-numerically marked keys of a Touch-Tone telephone instrument. A computer to which the telephone is connected by a telephone network decodes the numeric sequence represented by depressing keys needed to spell out the selected word or words. The computer then provides an oral response transmitted through the telephone receiver to the caller, as audible intelligence.

12 Claims, 2 Drawing Figures

TELEPHONE NETWORK, ACCESS PROCESSORS AND DATA BASE COMPUTER

METHOD OF AND MEANS FOR ACCESSING COMPUTERIZED DATA BASES UTILIZING A TOUCH-TONE TELEPHONE INSTRUMENT

BACKGROUND OF THE INVENTION

1. Field Of The Invention

The present invention relates generally to computer systems, and in a more particular sense relates to those systems in which a computer is connectable through a telephone network to remote locations from which queries can be directed to the computer, and to which the computer transmits a suitable response.

2. Description Of The Prior Art

Typically, at present a computer-stored data base is accessed through a telephonic communications network, through the medium of remotely located computer terminals having in association therewith display screens and/or teleprinters. Commonly, one keyboards, through the terminal, a coded, alpha-numeric query, in order to transmit questions and requests for information from the remotely located data base. From the data base, a response is transmitted via a data base distributor to the computer terminal in alpha-numeric format. These responses are typically displayed upon a screen at the site of the terminal and/or are automatically printed at that location.

The normal procedure is to have the computer terminal connected to a telephone line which can be linked to an access processor of some network system. The data base distributor is also connected to the same network or to a network which can be interconnected with the network in which the telephone line has been accessed.

Information or a query can be sent from the computer terminal through the telephone line link to the network through some access processor. The query is addressed so that it will be guided through an egress port of the network to the data base distributor and the data base computer. Information is sent to the computer terminal of the individual making the inquiry via the same route, but in the response case, the information flows in the opposite direction. That is, it flows from the data base computer and data base distributor to the computer terminal making the inquiry.

As presently constituted, the computer terminal provides two functions necessary for information exchanges between data base distributors and users. These are an alpha-numeric keyboard for input and a video screen or teleprinter for output.

It is clear that the present arrangement has the disadvantage in that it is operative only if the subscriber or user of the central data base has, as regular equipment at his location, a complete computer terminal interfaced with the telephone network, for input to the data base; and a display screen and/or automatic printer, for receiving the intelligence transmitted in response to a query addressed to the computer in which the data base is stored.

In these circumstances, there is obviously a minimal market penetration, in that certainly the overwhelming majority of individual consumers, especially residential consumers and those operating small businesses, do not have computer terminals and the associated receiving equipment, interfaced with a computer through the medium of a telephone network. While the computers presently exist in which information is stored that the ordinary consumer desires to have, along with telephone networks that extend into the consumer's home or small business, the computer terminal, and the screen and/or printer, are not customarily found in the ordinary residence or small business establishment.

It has been heretofore been proposed, in this regard, to utilize a telephone instrument having a touch pad as a form of computer terminal, to provide access to a computerized data base. Heretofore it has been proposed that the touch pad be modified substantially and/or operated in a manner that requires double-punching of the keys or other relatively complex input modes.

SUMMARY OF THE INVENTION

The present invention aims to obviate the disadvantages that have been noted in connection with the prior art. To this end, summarized briefly, the invention utilizes a completely conventional touch pad of a telephone instrument, requiring no masking of the pad, and requiring no requirement for double-punching of keys, or other complex modes of inputting information into the telephone network to provide access to the computerized data base. Rather, the invention involves no more than a simple impression of a word or words upon the touch pad, by selecting the keys which have alphabetic indicia that permit spelling out of the legend that is to be transmitted to the data base.

Keyboarding of a word or words into the telephone network in the manner described above results, so far as the computer is concerned, in its receiving a numeric string of impulses. The computer, in this connection, will be programmed to translate the numeric string so received into an alphabetic sequence that represents the only word or words capable of being analogized to the specific numeric sequence received by the computer.

The computer having encoded the numeric string into a sensible or intelligent alphabetic mode, is now adapted, through its program, to respond to that specific, alphabetic mode by transmitting an oral response audible through the receiver of the caller's telephone.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
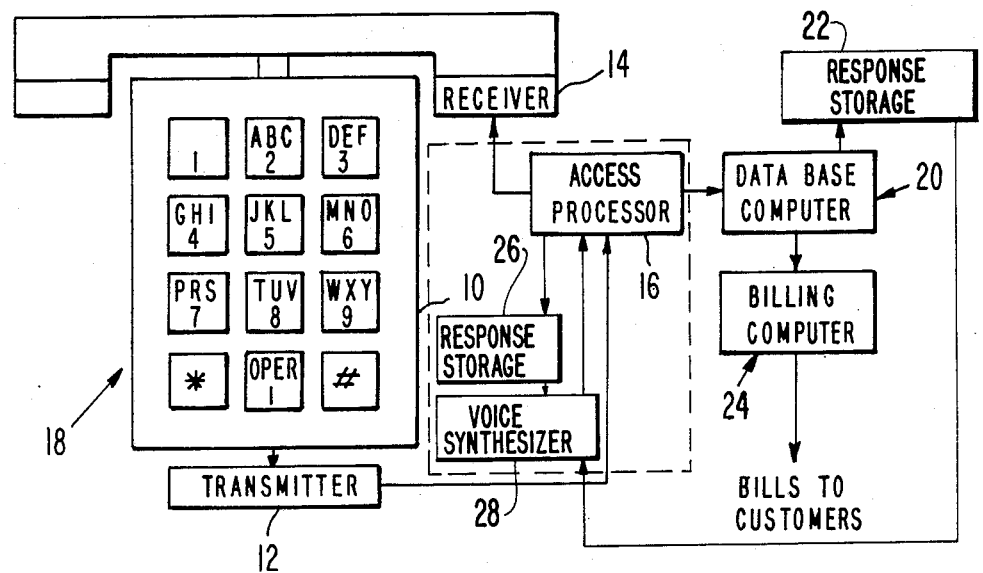
FIG. 1 is a block diagram showing schematically the relationship of the telephone instrument when interfaced with associated computer components.

Referring to FIG. 1, the reference numeral 10 designates a completely conventional key pad of an ordinary telephone instrument of the TOUCH-TONE ® type. The telephone instrument of which key pad 10 is a component also includes transmitter 12 and receiver 14.

Figure 2:
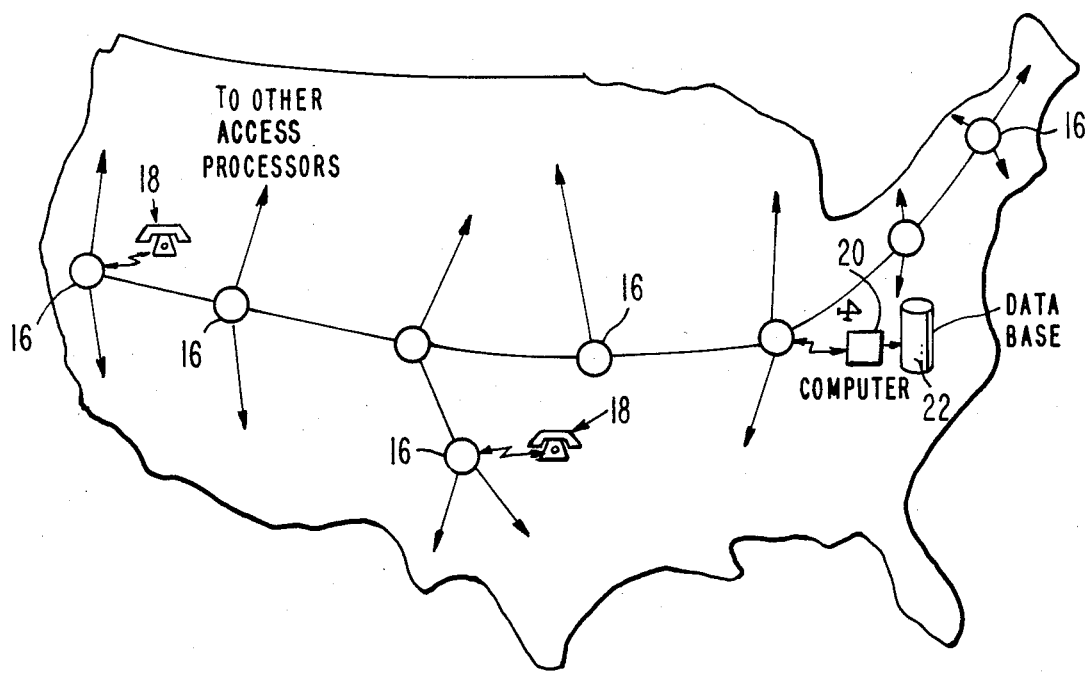
FIG. 2 is a schematic representation illustrating a national map and the manner in which a system according to the present invention can be extended on a nationwide basis.

Designated as 16 is an access processor, which itself is a computer station connected between the telephone instrument and a main frame computer located at a suitable geographic location which as shown in FIG. 2 can be anywhere in the nation.

Telephone instrument components 10, 12, 14 are part of a telephone instrument generally designated 18 in FIG. 2. Telephone instruments 18 are connected to access processors suitably located across the nation as part of a national network. All telephone instruments in a particular region feed into a regional access processor, which in turn is connected to a main frame computer 20 provided with suitable data bases 22.

Essentially, this comprises the complete system. As indicated above, each and every component of the system is, per se, conventional and it is of particular importance that no modification of the telephone instrument, in any way, is required.

The usefulness of the system is found in the fact that it incorporates in a completely conventional telephone instrument the capability of substitution of the instrument for a computer terminal having alpha-numeric capability. Considering that only a comparatively few residential or small business subscribers have, at present, terminals of this type, the present invention enables a greatly expanded number of potential users to have access to data base distributors. In this system, the telephone instrument becomes the computer terminal, in that the key pad of the instrument assumes the encoding and transmitting function of a computer terminal keyboard. A response from the computer becomes an audible message addressed to the calling telephone and received by the user through the receiver of the telephone instrument. The telephone instrument receiver in this way assumes the function now discharged by a display screen and/or automatic printer located at the site of the computer terminal from which the inquiry came.

As an example, suppose it is desired to input the word P-A-T-E-N-T using a key pad of the telephone as part of a data base inquiry. Using a computer terminal the word PATENT would be typed on the keyboard. Using a key pad telephone, the pad keys have letters superimposed upon numbers according to the following scheme:

| ALPHABETIC | | | NUMERIC |
|---|---|---|---|
| A | B | C | 2 |
| D | E | F | 3 |
| G | H | I | 4 |
| J | K | L | 5 |
| M | N | O | 6 |
| P | R | S | 7 |
| T | U | V | 8 |
| W | X | Y | 9 |

In this scheme, the letters Q and Z are assigned to the numeric digit 1. The numerics 0 and 1 do not now have an alphabet assigned to them. In addition to the numerics 0–9, there are two keys labelled * and # which do not have any alphabetic assignment. They are hereby assigned as "space" and "end transmit" respectively.

So, to express the word P-A-T-E-N-T, the numeric keys 7-2-8-3-6-8-# are depressed. It is postulated that computer intelligence can decode this numeric string back to the original alphabetic string.

In the first place, a trivial solution to the decoding, is to have the computer, for a limited set of data, convert all expected alphabetic strings to numeric strings and store them in a file. Then, receipt of a numeric string causes lookup in the numeric string file and the conversion to the alphabetic string is thus achieved.

In the case of a duplication such that two (or more) identical numeric strings resulted from different alphabetic strings, the computer is programmed to ask the user which alphabetic string was intended.

The concept of programming a computer to speak to the user is currently implemented by use of a chip which translates from data stored in the computer memory to intelligible speech.

Another approach to decoding the numeric string back to its original alphabetic string is to employ algorithms which might be used in breaking military codes. It is to be noted that military code breaking was one of the earliest tasks assigned to computers. Computers are able to break codes which military users desire to keep encrypted. It follows that computers have a much easier task breaking codes that users desire to have broken.

Taking the example of P-A-T-E-N-T, encoded as 7-2-8-3-6-8-#, the computer has the task of examining the numeric string to determine its original alphabetic string. This is easily accomplished by taking advantage of the redundancy inherent in the English language, particularly with respect to the usage of vowels vs. consonants.

The possible alphabetic combinations resulting from the numeric string are derived as follows:

| Numeric | 7-2-8-3-6-8-# |
|---|---|
| Alpha- | P A T D M T |
| betic | R B U E N U |
| equivalents | S C V F O V |

The computer, in accordance with the invention, is programmed to create the table of alphabetic equivalents, as above, and then to scan the table from left to right discarding all the impossible combinations. For example, the string beginning with the numeric 7 equated to P-R-S results for the first two letters in P-A, P-B, P-C; R-A, R-B, R-C; and S-A, S-B, S-C. Of these nine combinations, clearly only P-A, R-A, and S-A are admissable strings. The others are impossible and so forth, across the possible alphabetic string combinations corresponding to the numeric pair 7-2.

As the computer proceeds across the numeric string, two letters at a time pairing numerics first-second, second-third, third-fourth, fourth-fifth, etc. discarding all impossible strings, only a very few strings remain which are possibly valid with respect to the English language.

For example, for the word "PATENT", other possible strings are RATENT or SATENT. Impossible strings are RBTENT or SBTENT, etc. After discarding all impossible strings, the computer evaluates the remaining possible strings to deduce what the questioner had in mind.

After deducing what the questioner had in mind, i.e., selecting from among the possible strings, the computer checks its memory versus those strings which are relevant to the phone number at hand. If after reviewing possible strings which resulted in redundant possible strings, e.g., PATENT vs SATENT or RATENT and finding more than one in the data set of allowable inputs to the specific phone number, the computer will then be instructed to verbally ask the questioner which word is meant. That is to say for example, the computer speaks to the inquirer and says "Do you mean 'PATENT' or 'SATENT'? If you mean 'PATENT' push the number 1. If you mean 'SATENT' push the number 2."

Another relevant piece of technology is a "valid word dictionary" of upwards of 50,000 words which is a common device in word-processing systems. The dictionary is used to catch spelling errors by assuming that a correctly spelled word will be in the dictionary whereas an incorrectly spelled word will not. This would be useful in sorting out a syntactically valid alphabetic string such as R-A-T-E-N-T from actual valid words.

To summarize the above, the computer will have the ability to distinguish from a given numeric string, the alphabetic string which the caller had in mind. The computer achieves this by analysis of the redundancy in the English language and by the analysis of the closed data set of subject matter appropriate to the given telephone number which was called.

In addition to the computer's ability to distinguish the meaning of a numeric string and to search its memory for those alphabetic strings appropriate to the given telephone number, another capability is achievable by the computer due to the nature of the telephone system. When a telephone call is placed, the telephone central has the ability to detect the caller's telephone number. This is why automatic dialing (without operator assistance) is possible and "AMA" (Automatic Message Accounting) can be achieved by the computer.

The telephone company has in its computer memory banks the geographical location of every central office. For example, for telephone number 609/397-2619, the telephone company computer has a pair of horizontal and vertical constants called H-V which are equivalent to the latitude and longitude correct to about one minute of the central office at 609/397. Therefore, when a call is placed, the computer knows the geographical location of the source. So, for many kinds of information bank questions, such as, "Where is the nearest dry cleaner?", the computer can answer without any specific input by the caller because it knows the caller's geographic location as a function of the telephone exchange from which the call was placed. This analysis of geographic location and request for information represents a wide range of currently implemented information services such as dealer information supplied in response to "Where-to-buy-it" questions.

In addition to the telephone company's knowledge of the geographic location of the source of the telephone call, the situation of the telephone company with respect to spinning off its operating companies provides an opportunity for independent information service providers.

The telephone company currently provides information services called "936" or "Dial-It" services, such as, weather (936-1212) and time (936-1818). These services provide the same number nation-wide for a given service. That is, 936-1212 is the number in New York, San Francisco or Philadelphia for the weather. Therefore, having a nationally advertised telephone number which is constant throughout the country, one can have national advertising referenced to the data bases which are provided by the service.

For example, analogous to the weather service and time service, the invention permits establishment of a telephone service to provide current stock quotations. It is assumed that this type of service would be provided by organizations not associated with the telephone operating companies. It is assumed that the operating companies will deliver a service of a "936" nature, bill the caller, and remit to the information provider a portion of the charge made to the caller. As an example, "936-FILM" could be a service to provide callers with the name, address and show time of the nearest movie theater which is playing a movie whose title the caller would keyboard in the numeric fashion. Perhaps the most important application of this technique would be to provide an interface between information providers and those people who do not have a computer terminal. Such providers may include, for example, a company supplying stock quotations; or perhaps a company that will advise the nearest location where a particular movie is playing.

As an interface between the callers without computer terminals and the information providers, this computer system receives calls from the "TOUCH-TONE" ® telephones and translates them into data which appears to the information provider as if it had been received from a computer terminal. The data is then sent along to the designated information provider company. When the information provider company provides the output data in digital format which is intended for transmission to a computer terminal, the computer system receives such data and translates it into a vocal response back to the caller. For example, if a caller on a telephone were to ask the name of the nearest theater playing "Casablanca", this data would be relayed to the information provider that has previously put up the data bank. The answer, e.g., Rialto, is provided digitally by the data base owner and is intended for transmission to a computer terminal. Instead of going to a computer terminal, the characters R-I-A-L-T-0 would be sent to the proper node of the interface computer network system and there transformed into the vocal response "RIALTO" which would then be relayed via telephone to the caller.

A problem arises in the use of a system of this nature to answer inquiries generated by advertising, such as, "Where to buy an Arrow ® Shirt". The computer can respond, for example, "J. C. Penney, Quakerbridge Mall" in response to the keyboarding of "Arrow ® Shirt" (2-7-7-6-9-*-7-4-4-7-8-#) without any difficulty but the problem is that the advertiser wants to know which advertising medium generated the inquiry (for purposes of advertising dollar allocation).

This is readily solved in practicing the invention by programming the computer to initiate a dialogue such as:

Computer: "Thank you for requesting the name of your nearest Arrow Shirt dealer. Please keyboard the name of the medium in which you saw the advertisement."

Caller: "TIME MAGAZINE".(8-4-6-3-*-6-2-4-2-1-4-6-3-#)

The computer is thereby enabled to decode the string for the name of the medium and provide the data for the advertiser.

An advantage of this system is substitution low-cost digital data transmission such as is available from several X.25 networks, for expensive voice transmission. The usage of voice-to-digital computer network nodes allows substitution of digital data transmission for inward WATS for information dissemination.

This discussion has assumed that a telephone having a key pad is required to communicate with the system. If such is not available, hand-held tone generators are available at relatively low cost.

In the event that keying errors are made on the tone pads, the computer system would be able to perceive the error quickly. Various techniques currently employed in the telecommunications industry would be used to decipher the caller's intent.

One procedure, known as "answer back analysis", can detect errors and determine the caller's intent in over 99% of the errors. In case of a dubious decision, the computer can always ask the caller his intent.

This disclosure deals with being able to have the telephone supply numeric inputs that can be interpreted by a computer to be alpha-numeric without any prior operator training. Also, no special training such as multiple keying of the telephone pad is required for alphanumeric.

It will be necessary to add a speech synthesizer to each of the conventional access processors, in order to have computer generated voice output back to the telephone that made the original query. Thus, the access processor will consist of the following sections:

Disc file with "Banner" messages
Concentrator/Deconcentrator
Multiplexer/Demultiplexer
Protocol Conversion
Speech synthesizer to serve a number of ports
Capability of handling several thousand ports
Packet assembler/disassembler Referring again to the drawing, in a typical situation the input message is directed from the telephone instrument (and in particular the transmitting components thereof) to an access processor 16. The access processor reads the pulses transmitted and converts them to a digital protocol that is, the analog waveform of the transmitted pulses is converted to a digital form in which it becomes a stream of binary "bits", known in the computer art as "digital protocol". The conversion is effected by circuitry well known in the computer art and basic to present-day computer structure, in which such conversions are routinely made in the analog waveforms received from the keyboards of computer terminals. At the access processor there is also provided local data storage identified in FIG. 1 as "response storage" and designated in that figure of the drawing.. If the inquiry is such that it can be answered by utilizing the data maintained at the local access processor storage, the access processor conducts a dialogue, that is, it responds to the inquiry, utilizing pre-packaged messages from the local audio storage. This utilizes a voice synthesizer 28 which is converted from the digital message protocol, and is transmitted from the access processor to the receiver of the telephone instrument.

In the event that response to the inquiry cannot be made utilizing local storage of data at the access processor, the access processor transmits the message in digital form to the main frame computer, via the network shown in FIG. 2. Here there is called into use the concentrator/deconcentrator; or the multiplexer/demultiplexer; or the packet assembler/disassembler.

With the digitally encoded message transmitted from the access processor to the data base computer 20, there is transmitted the calling number, and the called number. These go along with the numerically coded inquiry data.

Upon receipt of this message at the computer, the computer, by reference to its data bank or base 22, transmits alphabetic data to the access processor for conversion by voice synthesizer 28 to the synthetic voice mode as a response to the input query. And, the computer may also transmit coded data to control the dialogue with reference to local audio storage at the access processor.

The computer, at the same time, as shown in FIG. 1, transmits data to the telephone company's billing computer 24, which receives this data and utilizes it for the purpose of generating a bill chargeable to the subscriber who has made the inquiry.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. The method of utilizing a telephone instrument having transmitter and receiver components, and further including a touch pad having individually depressable alpha-numeric keys each representing a single number and a plurality of letters of the alphabet, to obtain a desired piece of information as a response to an inquiry generated at the situs of the instrument, that comprises the steps of:
   (a) spelling out one of more words by a single depression, for each letter in a work, of only that key, and no others, that represents said letter;
   (b) transmitting the alphabetically ordered inquiry, encoded as a numeric string, from the transmitter component of the instrument to a computer means;
   (c) at the computer means, decoding the numeric string by selecting which of the several alphabetic characters represented by each depressed key will combine with similarly selected characters of the other depressed keys to form the spelled work or words, including the following sequence:
      (1) responsive to the depression of the first and second numeric keys used, selecting only a letter or letters among those represented by the first key, and only a letter or letters among those represented by the second key, that can be validly combined as a first-and-second-letter pairing in the formation of a word, while rejecting all other letter combinations that cannot be so paired,
      (2) responsive to the depression of the third key used, selecting only a letter or letters that can be combined with the selected letter(s) represented by the second key as a second-and-third-letter pairing in the formation of a word or words, while rejecting all other letter combinations that cannot be so paired, and
      (3) continuing in like manner through the numeric string to determine similarly acceptable consecutive letter pairings;
   (d) matching the numeric string as decoded at the computer means with a piece of information that has been previously stored therein and is to be transmitted to the telephone instrument; and
   (e) synthesizing said piece of information in voice form and transmitting it to the receiver of the instrument.

2. The method of claim 1 including the steps of first transmitting the inquiry to a first component of said computer means in which basic, pre-packaged responses are stored and which produces the responses to some of said inquiries; and secondly, if an inquiry cannot be responded to by said first component of the computer means, transmitting the inquiry to a second component of said computer means having the capability of supplying responses that cannot be made by the first computer means component.

3. The method of claim 2 in which the first component of the computer means is an access processor.

4. The method of claim 3 in which the second component of the computer means is a data base computer.

5. The method of claim 1 including the additional step of transmitting billing data from the computer means to a billing computer adapted to charge the cost of answering an inquiry to the customer responsible for paying for use of the telephone instrument from which an inquiry is transmitted.

6. The method of claim 1 that includes providing the computer means in the form of a series of access processors linked in a network, and a data base computer common to all the processors of said network.

7. The method of claim 6 that includes Providing each of the access processors with a store of pre-packaged responses in which each response is matchable with an inquiry transmitted from the telephone instrument; transmitting to the data base computer each inquiry not adapted for response by the access processor; and providing the data base computer with stored data adapted for creating a response to an inquiry transmitted to the data base computer.

8. The method of utilizing a telephone instrument having transmitter circuitry and a receiver, said instrument being of the touch-pad type having keys at least some of which are alpha-numeric and bear representations of a single number and an associated plurality of letters, to obtain a desired piece of information as a response to an inquiry generated at the situs of the instrument, that comprises the steps of:

(a) spelling out at least one word by momentarily depressing the keys bearing the letters of said word, once and only once for each letter of the word or words being spelled, in the order in which said letters appear in the spelled word, to form a string of letters encoded in numeric form in which each number in the string can represent any of the plurality of letters found on the same key as that number, and in which the encoded word represents an inquiry;

(b) transmitting said encoded string to a computer means;

(c) utilizing the computer means to compare the order in which the numbers appear in said string to select those letters associated with the respective numbers that will form the word spelled out by depression of the alpha-numeric keys and enter it in the computer means as a complete inquiry, including the following sequence:

(1) responsive to the depression of the first and second numeric keys used, selecting only a letter or letters among those represented by the first key, and only a letter or letters among those represented by the second key, that can be validly combined as a first-and-second-letter Pairing in the formation of a word, while rejecting all other letter combinations that cannot be so paired, (2) responsive to the depression of the third key used, selecting only a letter or letters that can be combined with the selected letter(s) represented by the second key as a second-and-third letter pairing in the formation of a word or words, while rejecting all other letter combinations that cannot be so paired, and (3) continuing in like manner through the numeric string to determine similarly acceptable consecutive letter pairings;

(d) matching up, within the computer means, a string of pulses that together from a correct response to the inquiry;

(e) synthesizing the response string of pulses to voice form; and (f) transmitting the synthesized voice form to the receiver of the telephone to provide the user with an intelligible audio response to the inquiry.

9. The method of claim 8 in which initial transmission of the encoded inquiry to the computer means is screened thereby for qualification of the inquiry as one capable of a response utilizing pre-constituted, ready-to-use data.

10. The method of claim 9 including the step of having the computer means, if the inquiry does not so qualify, draw upon a data base in which a correct response is formulated according to the content of the inquiry.

11. The method of claim 10 in which the step of voice-synthesizing the response is carried out with respect to each and every inquiry transmitted to the computer means.

12. The method of utilizing a telephone instrument, of a type that will enter a transmitting mode by depressing alphanumeric keys each of which represents one single-digit number and a plurality of letters of the alphabet, said instrument having transmitting circuitry and an audio receiver in which the transmitting component substitutes for a computer terminal in the sense of transmitting an encoded inquiry and the receiver substitutes for a display screen and printer in the sense of providing a response to the inquiry, that includes the steps of:

(a) spelling out one or more words by a single depression, for each letter in a word, of only that key, and no others, that represents said letter;

(b) transmitting the alphabetically ordered inquiry encoded as a numeric string to an access processor;

(c) at the access processor, decoding the numeric string by selecting which of the several alphabetic characters represented by each depressed key will combine with similarly selected characters of the other depressed keys to form the spelled word or words, including the following sequence:

(1) responsive to the depression of the first and second numeric keys used, selecting only a letter or letters among those represented by the first key, and only a letter or letters among those represented by the second key, that can be validly combined as a first-and-second-letter pairing in the formation of a word, while rejecting all other letter combinations that cannot be so paired, (2) responsive to the depression of the third key used, selecting only a letter or letters that can be combined with the selected letter(s) represented by the second key as a second-and-third letter pairing in the formation of a word or words, while rejecting all other letter combinations that cannot be so paired, and (3) continuing in like manner through the numeric string to determine similarly acceptable consecutive letter pairings;

(d) determining if the numeric string, as decoded at the access processor is subject to match-up with any one response selectable from a memory bank of preformulated reponses stored at the access processor;

(e) if a response can be provided by the access processor, voice-synthesizing the response and transmitting the same to the inquirer via the audio receiver;

(f) if a response cannot be formulated by the access processor, transmitting the inquiry to a data base computer for formulation of a response;

(g) in the event that the response is formulated by the data base computer, transmitting the response of the data base computer to the access processor; and (h) at the access processor, voice-synthesizing the response of the data base computer for transmission to the caller via the audio receiver.

* * * * *